Patented Apr. 28, 1942

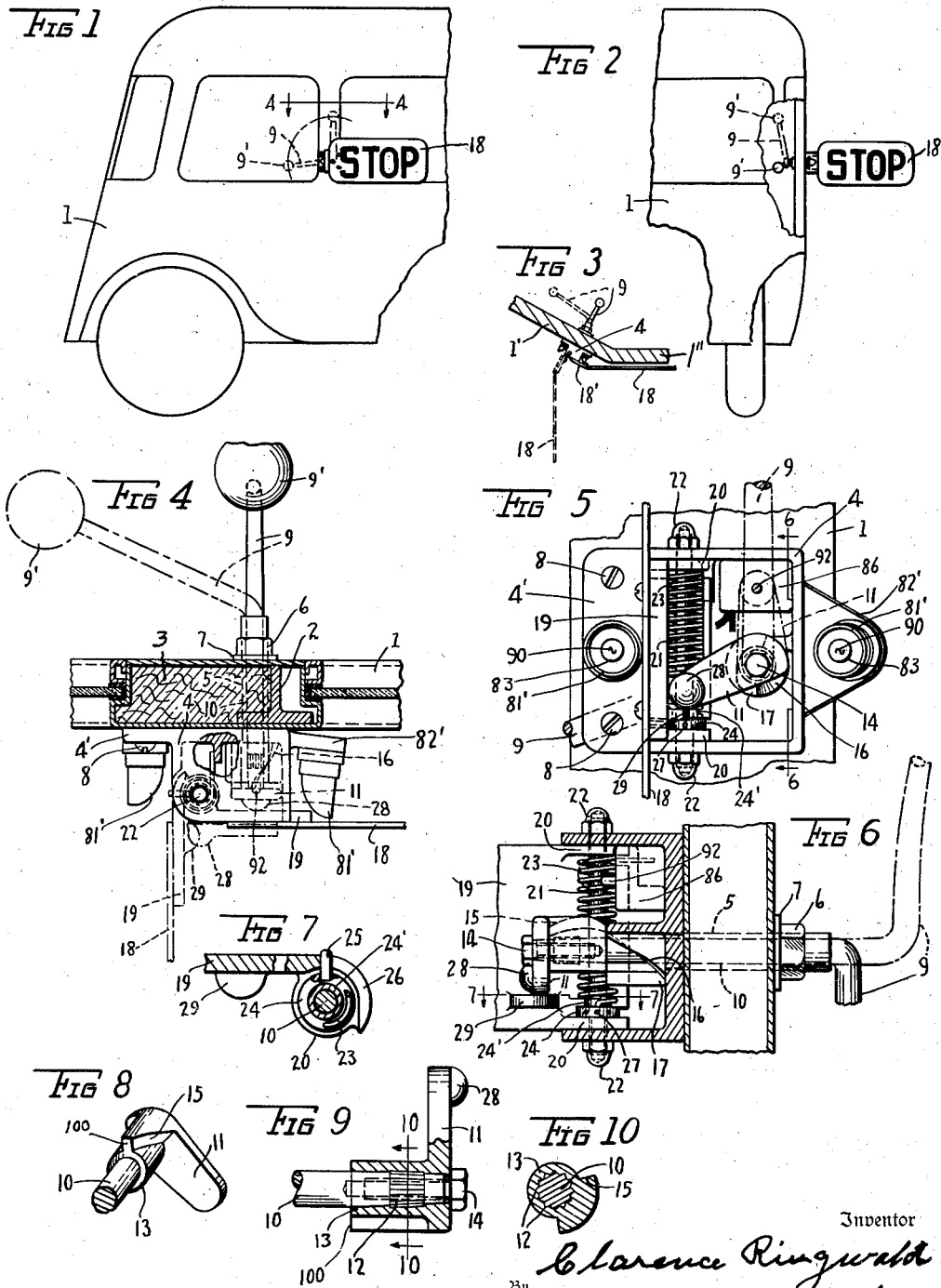

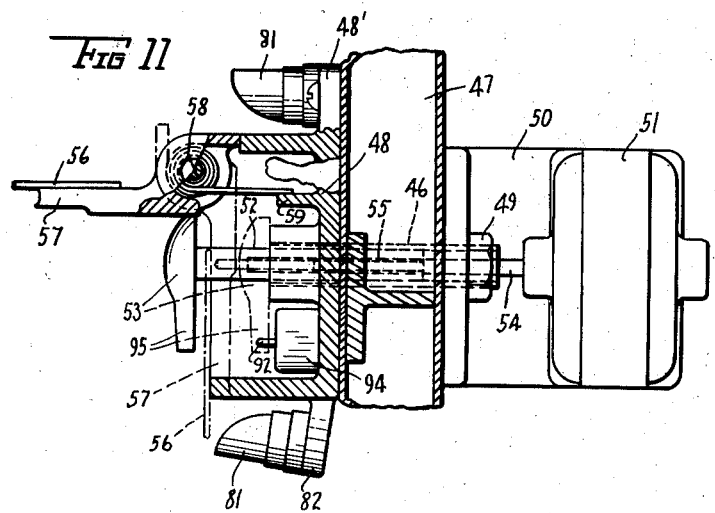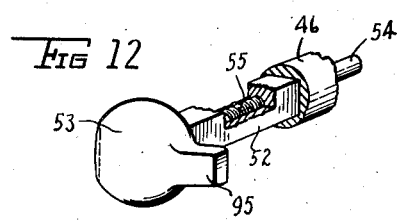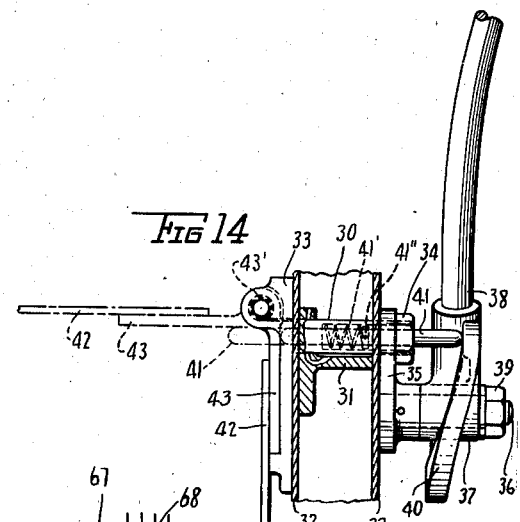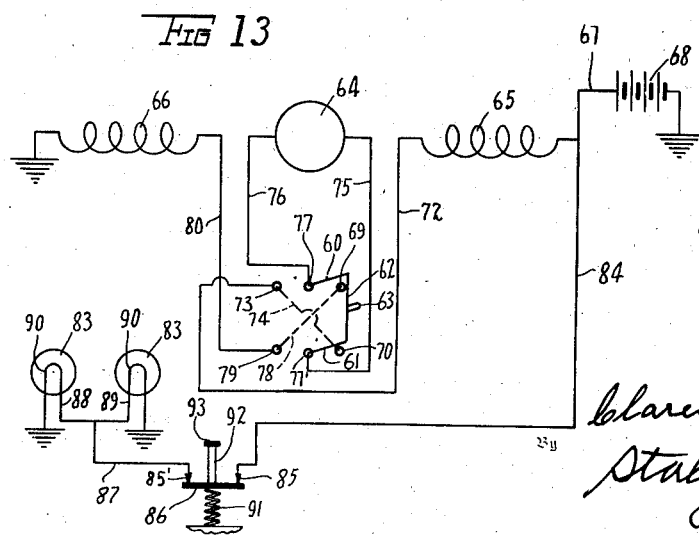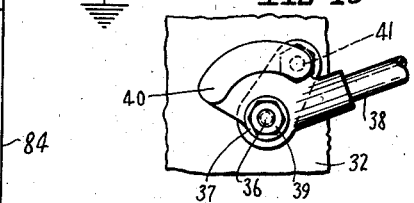

2,281,171

UNITED STATES PATENT OFFICE 2,281,171

SIGNAL FOR MOTOR VEHICLES

Clarence Ringwald, Springfield, Ohio

Application June 17, 1940, Serial No. 340,877

13 Claims. (Cl. 116—52)

This invention relates to signalling devices for motor vehicles, it more particularly relating to a signalling device in the nature of a semaphore which is swung into and out of operative position by means operated from the interior of the vehicle.

One of the objects of the invention is to provide a signalling device of the character referred to which can be readily installed at any suitable point upon a vehicle by the simple expedient of boring a comparatively small opening in the body of the vehicle at the point where the signal is to be installed, so that some of the operating parts may be extended through this opening to put part of the operating parts on the outside of the vehicle and other parts on the inside.

A further object of the invention is to provide a signalling device of this nature which is manually operated.

A further object of the invention is to provide a signalling device of the kind referred to which is motor-operated.

Other objects will appear from the following description and claims.

In the accompanying drawings:

Fig. 1 is a side elevation of a portion of a vehicle to which the signalling device has been applied.

Fig. 2 is a front elevation of the same.

Fig. 3 is a detail showing in horizontal section a portion of a vehicle body having a tapering portion together with a top plan of the signalling device shown applied thereto.

Fig. 4 is a fragmentary horizontal section on the line 4—4 of Fig. 1 on an enlarged scale, the device being shown in non-signalling position in full lines, while dot-dash lines show the parts when the device is in signalling position.

Fig. 5 is a side elevation on a still larger scale of the device in signalling position with dot-dash lines showing the other working position.

Fig. 6 is a vertical section on the line 6—6 of Fig. 5 on the same scale as Fig. 5, with the same notation as to dot-dash lines.

Fig. 7 is a partial horizontal sectional view taken on the line 7—7 of Fig. 6 on a scale slightly larger than employed in Fig. 6.

Fig. 8 is a fragmentary view in perspective of a detail, the scale being the same as employed in Figs. 5 and 6.

Fig. 9 is a view partly in elevation and partly in longitudinal section of some of the details, the scale being the same as in Fig. 7.

Fig. 10 is a transverse section on the line 10—10 of Fig. 9 on the same scale as in Fig. 9.

Fig. 11 is a sectional view of a modified form of signal device, the device being a motor driven arrangement intended for remote control installations, the view being taken on a line similar to the line 4—4 of Fig. 1. The scale is the same as that employed in Figs. 5 and 6.

Fig. 12 is a fragmentary perspective view of some of the parts of the device shown in Fig. 11 with portions broken away to show in section the manner of constructing the same.

Fig. 13 is a schematic electric wiring diagram of the circuits employed in the device shown in Figs. 11 and 12.

Fig. 14 is a partial plan view of a further modified form of device, the sectional portion of the view being taken on a line similar to the line 4—4 of Fig. 1.

Fig. 15 is a partial view in elevation of the device shown in Fig. 14, the view being taken from the right hand side of Fig. 14.

Referring first to Figs. 1 to 10 of the drawings, I represents a vehicle body, such as the body of a school bus, one of the pillars being indicated at 2 and a portion of the wooden filling being shown at 3 (Fig. 4).

A metallic casing is indicated at 4, this casing being open on its outer side, and to this casing is secured a bushing 5 which is extended through a bore in the body, this bore preferably extending through one of the flanges of the pillars and projecting beyond the inner surface of the body. The bushing is exteriorly threaded to receive a clamping nut 6 to clamp the casing 4 to the outer surface of the body, a washer 7 being preferably interposed between the nut and the body. To further secure the casing in position, one end thereof is preferably provided with a flange 4' which is fastened to the body by the screws 8.

On the interior of the body is an operating handle 9, one end of which has a hand knob 9' and the other end of which is bent to form a shaft 10 which is journalled in the bushing and of greater length than the bushing. The outer end of this shaft has connected therewith a cam arm 11, the preferable manner of connecting the two parts together being shown in Figs. 9 and 10. The end of the shaft 10 is tapered and is serrated as shown at 12 and this serrated tapered end is forced into the hub 13 of the arm and held tightly therein by the screw 14 which is screwed into the end of the shaft. This manner of securing the cam arm to the shaft permits of a relative adjustment between the arm and handle 9 to enable the handle to be placed in the most convenient position for the driver.

The hub 13 of the arm is formed with a cam face 15 which cooperates with a cam face 16 on the boss 17 formed integrally with the casing 4, the shaft projecting through this boss.

The semaphore of the signal is indicated at 18, this semaphore bearing suitable indicia such as the word "Stop" and being formed of sheet metal. One end of the semaphore 18 is attached preferably by screws to the leaf 19 of one member of a hinge, the leaf having a pair of ears 20 perforated to receive a pintle 21, this pintle being carried by the front and rear walls of the casing 4 and attached thereto by the nuts 22. Surrounding the pintle is a coil spring 23, one end of which is secured to a fixed point of the casing 4 and the other end of which is inserted in an opening in the side of a collar 24 secured to the hinge member 19 by a removable pin 25 which extends through a slotted opening 26 in the hinge member and into any one of a series of openings 27 on the periphery of the collar 24; the plurality of openings permitting the collar to be rotated to adjust the tension of the spring. The collar preferably has an extended hub 24' to provide a seat for the adjacent end of the spring. The outer end of the arm 11 has a cam projection 28 to engage with the hinge member 19.

In Fig. 3 a slight modification is shown in which the signal is shown applied to a sloping part 1' of the body 1". In this case in order that the semaphore 18 will project at right angles to the straight portion of the body when in signalling position the semaphore is bent as indicated at 18', this bend also enabling the semaphore to lie flat against the straight side of the body when in inoperative position.

The operation of the signal as thus far described is as follows: The operating handle 9 is grasped by the driver and thrown to the dotted line position shown in Fig. 4 when it is desired to place the semaphore in signalling position. The first movement of the operating handle rotates the shaft 10 and moves it axially by the action of the cam faces 15 and 16 to the position shown in full lines in Fig. 6, further rotation of the shaft causing the cam projection 28 to engage with the surface of the hinge member 19 to swing the semaphore to the position shown in Fig. 2 against the tension of the spring 23. When the cam has passed the dead center line it engages with a stop 29 on the hinge member 19 to prevent further rotary movement of the cam, the cam faces being then disengaged and that part 100 of the hub 13 of the arm 11 bearing on the end of the boss 17 (Fig. 6) so as to hold the semaphore in signalling position. To return the parts to inoperative position the operating handle is moved in the reverse direction which first rotates the shaft 10 to cause the cam arm and its projection 28 to become disengaged from the hinge member, and the cam faces 15 and 16 to become again engaged; the coil spring 23 acting to swing the hinge member and semaphore to the non-signalling position shown in Fig. 1 and, by the contact of the hinge member with the cam arm, push the shaft 10 and operating handle back to the initial position shown in dotted lines in Fig. 6. The hinge member 19 will swing against the outer side of the casing 4 and act as a cover for the casing, the end walls of the casing projecting slightly beyond the side walls so that the hinge member will swing between the extended portion of the end walls as shown in Fig. 4.

In Figs. 14 and 15 there is shown a modification of the means for operating the signal manually. In these figures 30 represents a bushing which is inserted in a bore in the vehicle body, 31 representing one of the metallic pillars through one of the flanges of which the bushing is inserted as well as through the sheet metal side members 32. The outer end of this bushing is connected to a shallow casing 33 secured in any suitable manner to the outer surface of the vehicle body and the inner end of this bushing is threaded to receive a nut 34 which clamps to the inner surface of the body a bracket 35. This bracket has extending therefrom a pin 36 upon which is journalled the hub 37 of an operating lever 38, the hub being held in position by a nut 39 on the reduced threaded portion of the pin 36. The hub is provided with cam 40 which is adapted to engage with a shaft 41 which extends through the bushing and is axially movable therein. A semaphore 42 is secured to a hinge member 43 which is hinged to the shallow casing 33 in a manner similar to that already described in connection with Figs. 1 to 10 inclusive; a coil spring 43' being employed to hold the hinge member and its semaphore in non-signalling position. To throw the semaphore to signalling position the operator grasps the operating lever 38 to cause the cam 40 to move the shaft 41 axially to the dotted line position shown in Fig. 14 which swings the hinge member and the semaphore to the dotted line position shown in those figures. As the lever is moved back to the initial position a coil spring 41' located in an enlarged portion of the bore of the bushing and bearing against a collar 41" on the shaft 41 withdraws the outer end of the shaft from its engagement with the semaphore sufficiently to permit the spring 43' to return the semaphore to non-signalling position. The enlarged portion of the bore of the bushing extends to the inner end of the bushing.

In Figs. 11 and 12 there is shown another modification in which the signalling device is motor-operated by remote control. A bushing 46 is placed in a bore in the body 47 with its outer end connected to a casing 48 and its inner end threaded to receive a nut 49 which fastens a bracket 50 to the inner surface of the body. This bracket carries a small electric motor 51 of the reversible type. The bushing 46 has therein a slidably mounted shank 52 which has secured to its outer end a cam 53; the shank being straight-sided to fit a straight-sided bore in the bushing to prevent the shank from turning. The shaft 54 of the motor has a portion thereof journalled in the bushing and the outer end is screw-threaded as indicated at 55 and is received by a threaded bore in the shank 52. The semaphore is indicated at 56 and is secured to a hinge member 57 which is hinged on a pintle 58 carried by the casing 48. A coil spring surrounding the pintle has one end resting on a lug 59 integrally formed with the casing and the other end fastened to the hinge member 57. To throw the semaphore to signalling position the motor is started so as to project the shank 52 and cam 53 on the shank 52 against the hinge member to swing it to the position shown in Fig. 11. Reversal of the motor withdraws the shank and cam into the casing to permit the semaphore and hinge member to be returned to non-signalling position.

To operate the motor there is provided a manually-operated switch of the double-throw double-pole type as shown in Fig. 13, this switch being located in convenient reach of the driver while the signalling device may be located at a remote point. The knife blades of the switch are indicated at 60 and 61, being pivoted at 77 and 77' and connected by the bridge piece 62 provided with a handle 63. The rotor is indicated at 64, the fields at 65 and 66, and the supply line at 67; one of the fields, 66, being grounded.

The source of current is a battery 68. When the knife blades 60 and 61 are on contacts 69 and 70, current flows from the battery through wire 67, field 65, wire 72, contact 73, wire 74, contact 70, knife blade 61, and wire 75 to rotor 64, wire 76, knife blade 60, contact 69, wire 78, contact 79 and wire 80 to the grounded field coil 66. To reverse the motor the knife blades are switched to the contacts 73 and 79 so that current will flow from the battery through wire 67, field 65, wire 72, contact 73, knife blade 60, wire 76, rotor 64, and then through wire 75, knife blade 61, contact 79, and wire 80 to grounded field 66.

Provision is made for reflecting the light from electric light bulbs onto both sides of the semaphore. In Fig. 11 there is shown on opposite ends of the casing 48 reflectors 81, one of these reflectors being secured to the flange 48' and the other reflectors to a bracket 82. Within each of the reflectors is an electric light bulb 83.

Referring to Fig. 13, the source of current to illuminate the bulbs flows from the battery 68, wire 67, wire 84, contact 85, switch 86, contact 85', wire 87, and wires 88 and 89 to the filaments 90 of the bulbs, the filaments being grounded. The switch member 86 is normally pressed by a spring 91 against the contacts 85 and 85', the switch member having a stem 92 provided with a head 93. The switch is located in a small casing 94 secured to the interior of the casing 48, with the stem 92 and its head projecting therefrom in the path of a cam finger 95 which is carried by the shank 52. When the parts are in non-signalling position this cam finger 95 holds the switch member 86 out of contact with the contacts 85 and when the parts are thrown to signalling position the stem 92 is released by the cam finger so that the spring 91 will throw the switch to contacting position.

In Figs. 4 and 5 the reflectors are shown at 81' one of the reflectors being secured to the flange 4' and the other flange to a bracket 82' projecting from the casing; the light bulbs being shown at 83'.

Having thus described my invention, I claim:

1. In a signal for a motor vehicle, a housing secured to the vehicle body and lying wholly on the exterior thereof, a semaphore hinged to said housing, a spring carried by said housing normally holding said semaphore in non-signalling position, a bushing projecting transversely through the vehicle body and communicating with said housing, a structure the parts of which are rigid, an operating member controlled from the interior of the body, said structure being so constructed that at least a portion of the structure is movably carried by said bushing and adapted to be moved by the initial movement of said operating member in one direction to move at least a portion of said structure axially outward to first position the outer portion thereof in operative relation with said semaphore and by the final movement of said operating member in the same direction to cause at least a portion of said structure to move said semaphore to signalling position.

2. In a signal for a motor vehicle, a housing secured to the vehicle body and lying wholly on the exterior thereof, a semaphore hinged to said housing, a bushing carried by said housing and projecting through the vehicle body, a structure the parts of which are rigid for operating said semaphore at least a portion of which structure is movably carried by said bushing, an operating member on the interior of the body to move by the initial movement thereof in one direction at least a portion of said structure axially outward to position said structure in operative relation with said semaphore and operable by a final movement of said operating member in the same direction to cause at least a portion of said structure to swing said semaphore to signalling position, and spring means to return that portion of said structure which is carried by said bushing to inoperative position when said operating member has been moved in the opposite direction and to also restore said semaphore to non-signalling position.

3. In a signal for a motor vehicle, a hinged semaphore on the exterior of the vehicle body, a rigid structure for operating said semaphore so constructed that at least a portion of said structure projects transversely through the vehicle body, an operating member on the interior of the vehicle body, cam means to move a portion at least of said structure axially outward when said operating member is operated to position the outer end thereof in operative relation with the semaphore whereby a further operation of said operating member will cause said structure to move said semaphore to signalling position, and spring means for moving at least a portion of said structure axially in the opposite direction and restoring said semaphore to non-signalling position.

4. In a signal for a motor vehicle, a hinged semaphore on the exterior of the vehicle body, a bushing located in a transverse bore in the body the vehicle, a rigid structure for operating said semaphore so constructed that at least a portion of said structure projects through said bushing, an operating member on the interior of the body, cam means to move upon the operation of said operating member at least a portion of said structure axially outward through said bushing to position the outer end thereof in operative relation with said semaphore whereby a further operation of said member will cause said structure to move said semaphore to signalling position, and spring means to move at least a portion of said structure axially in the opposite direction and return said semaphore to non-signalling position.

5. In a signal for a motor vehicle, a housing secured to the exterior of the vehicle body, a semaphore hinged to said housing, a bushing carried by said housing and projecting through the vehicle body, a rigid structure for operating said semaphore comprising a shaft which projects through said bushing, an operating member on the interior of the body, cam means to move said structure axially outward to position the outer end thereof in operative relation to said semaphore whereby a further operation of said operating member will cause said structure to throw said semaphore to signalling position, and spring means to move said shaft axially in the opposite direction and said semaphore to non-signalling position.

6. In a signal for a motor vehicle, a housing open on its outer side secured to the exterior of the body of the vehicle, a hinge member pivotally connected with said housing, a semaphore connected with said hinge member, a bushing carried by said housing and extending transversely through the body of the vehicle, a rigid structure for operating said semaphore so constructed that at least a portion of said structure is slidably mounted in said bushing, an operating member comprising a cam operated from the interior of the body to move at least a portion of said structure axially outward to position the outer end thereof in operative relation with said hinge member and thereafter move said member and semaphore to signalling position, and spring means to move said hinge member and semaphore in non-signalling position with said hinge member closing the outer side of said housing and to also move at least a portion of said structure axially in the opposite direction.

7. In a signal for a motor vehicle, a hinged semaphore on the exterior of the vehicle body, a spring normally holding said semaphore in non-signalling position, a shaft projecting through the body of the vehicle, a handle on the interior of the vehicle body connected with said shaft to rotate said shaft, a cam connected with the outer end of said shaft cooperating with a stationary cam face to move said shaft axially outward when rotated, and a cam arm connected with the outer end of said shaft adapted to contact with said semaphore to throw said semaphore to signalling position by the rotation of said shaft.

8. In a signal for a motor vehicle, a hinged semaphore on the exterior of the vehicle body, a spring normally holding said semaphore in non-signalling position, a bushing located in a transverse bore in the body of the vehicle, a shaft projecting through said bushing, a handle on the interior of the vehicle body connected with said shaft, a cam on said shaft cooperating with a stationary cam face to move said shaft axially outward when said shaft is rotated by said handle, a cam arm connected with the outer end of said shaft rotatable therewith and adapted to contact said semaphore to move the same to signalling position, said spring when the shaft is rotated in the opposite direction acting to move said semaphore to non-signalling position and to move said shaft and its handle axially to their initial positions 9. In a signal for a motor vehicle, a housing secured to the exterior of the vehicle body, a semaphore hinged to said housing, a spring carried by said housing normally holding said semaphore in non-signalling position, a bushing carried by said housing and projecting through the vehicle body, a shaft projecting through said bushing, a handle on the interior of the vehicle body connected with said shaft to rotate said shaft, a cam connected with said shaft cooperating with a cam face on said housing to move said shaft axially outward when rotated, and a cam arm connected with the outer end of said shaft to cooperate with said semaphore to move the same to signalling position after the shaft has been moved axially outward and given a further rotation by said handle.

10. In a signal for a motor vehicle, a housing open on its outer side secured to the exterior of the body of the vehicle, a hinge member pivotally connected with said housing, a semaphore connected with said hinge member, a spring carried by said housing to hold said semaphore in non-signalling position and said hinge member in a position to close the outer side of said housing, a bushing carried by said housing and extending transversely through the body of the vehicle, a shaft in said bushing, a handle on the interior of the vehicle body and connected with said shaft to rotate said shaft, a cam connected with said shaft cooperating with a cam face on said housing to move said shaft axially outward when rotated, and a cam arm connected with said shaft to cooperate with said hinge member to move said semaphore to signalling position when said shaft has been moved axially outward and given a further rotation, said spring acting to return said semaphore and hinge member to non-signalling position and to also move said shaft axially to initial position.

11. In a signal for a motor vehicle, a hinged semaphore on the exterior of the vehicle body, a spring normally holding said semaphore in non-signalling position, a shaft projecting transversely through the body of the vehicle, a manually operated pivoted lever, a cam on said lever cooperating with the inner end of said shaft to move said shaft axially outward to cause its outer end to contact with said semaphore and throw the same to signalling position, and a second spring for moving said shaft in the opposite direction when said cam lever is returned to initial position.

12. In a signal for a motor vehicle, a hinged semaphore on the exterior of the body of the vehicle, a spring for holding said semaphore in non-signalling position, a straight-sided bushing projecting through the vehicle body, a shank slidably mounted in said straight-sided bushing and held from turning therein, a cam on the outer end of said shank, a reversible motor having its shaft projecting into said bushing and having a screw-threaded connection with said shank to slide said shank and its cam into and out of operative relation with said semaphore.

13. In a signal for a motor vehicle, a hinged semaphore on the exterior of the body of the vehicle, a spring for holding said semaphore in non-signalling position, a bushing projecting through the vehicle body one portion of which has a straight-sided bore, a straight-sided shank slidably mounted in said straight-sided bore, a cam on the outer end of said shank, a reversible motor having its shaft projecting into said bushing and having a screw-threaded connection with said shank to slide said shank and its cam into and out of operative relation with said semaphore.

CLARENCE RINGWALD.